July 1, 1930.  B. F. SEYMOUR  1,769,276
SHOCK ABSORBING TRANSMISSION
Filed Aug. 26, 1926
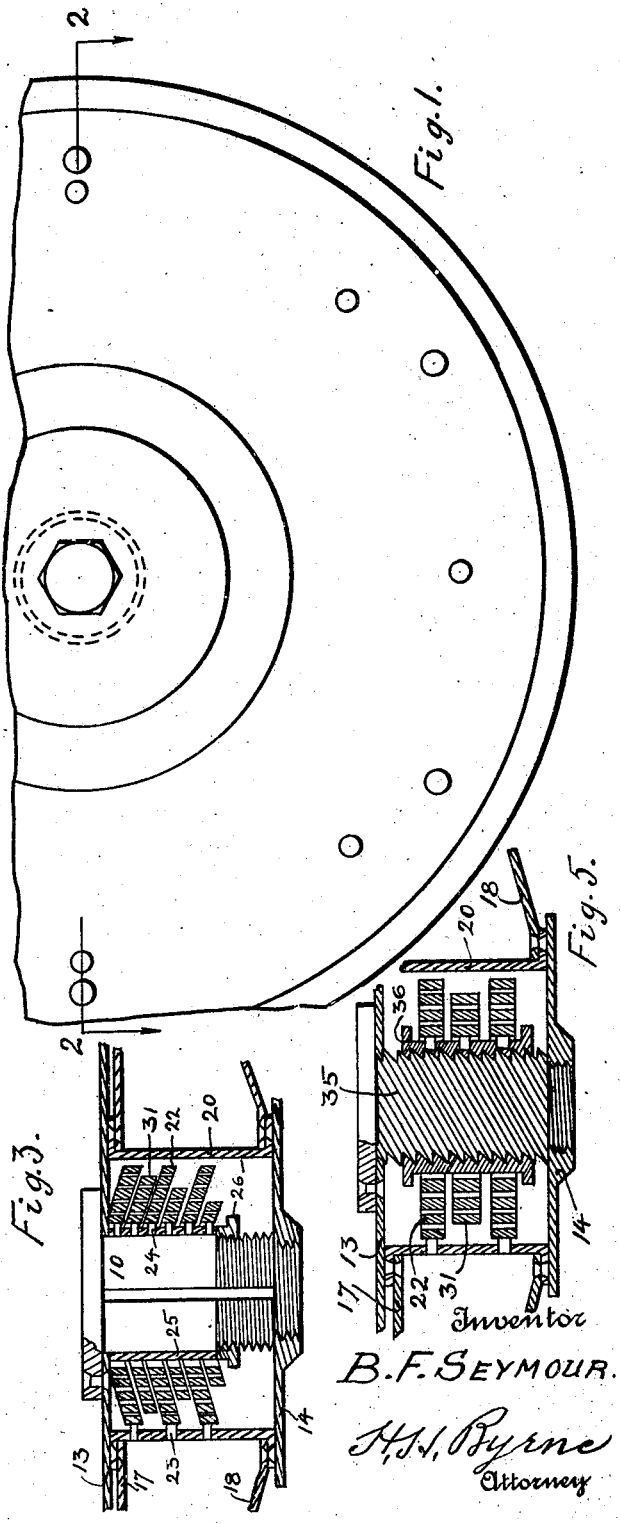
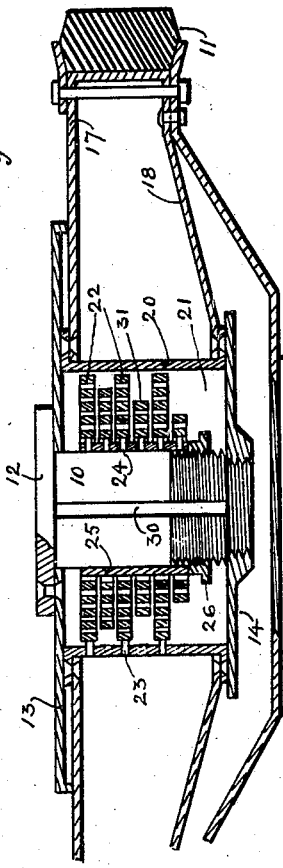
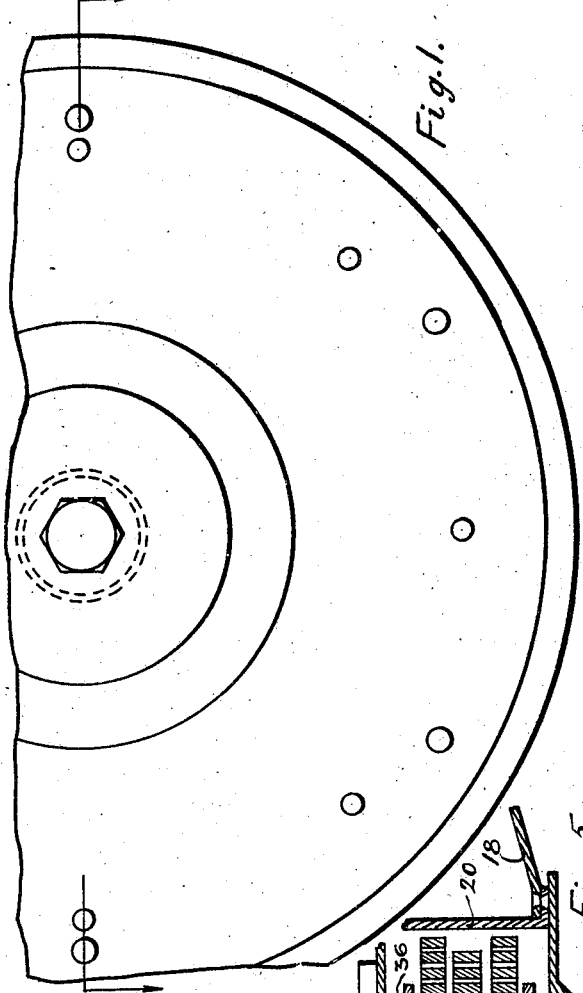
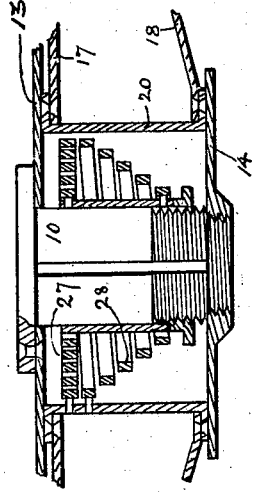
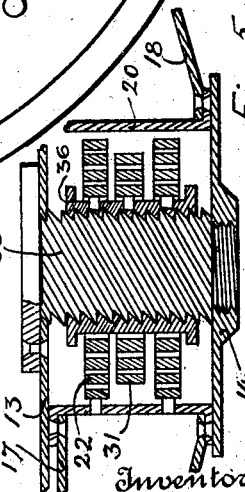
Inventor
B. F. SEYMOUR.
H. H. Byrne
Attorney Patented July 1, 1930

1,769,276

UNITED STATES PATENT OFFICE

BENJAMIN F. SEYMOUR, OF WASHINGTON, DISTRICT OF COLUMBIA

SHOCK-ABSORBING TRANSMISSION

Application filed August 26, 1926. Serial No. 131,615.

My invention relates to a shock absorbing transmission. In other words, the means transferring power from the driving to the driven elements is yieldingly connected to both so that if either element experiences a shock the same is substantially completely absorbed by the transmission means without affecting the other element.

In the drawing the device has been illustrated as applied to a vehicle wheel when the hub constitutes the driving element and the wheel rim the driven element, but it is evident that many other applications of the invention are possible. For instance, if the driving element were a large gear wheel or a pulley transmitting power through the shock absorbing transmission to a drive shaft, the conditions would be reversed and the hub in the drawing would be replaced by a shaft as the driven element.

In the accompanying drawing the present invention has been illustrated as applied to a vehicle wheel.

Figure 1 represents a fragmentary side elevation of the wheel;

Figure 2, a section along line 2—2 of Figure 1;

Figure 3, a view similar to Figure 2 with the springs in tensioned position;

Figure 4, a sectional view similar to Figure 2 of a modified form of the invention, and Figure 5, a sectional view similar to Figure 2 of still another modification.

In the drawing reference numeral 10 represents the driving member, in this case the wheel hub, and numeral 11 represents the driven member, which in this case is the wheel rim.

To the hub flange 12 is secured in any suitable manner the inner side plate 13, while the outer side plate 14 is nonrevolubly secured to the outer end of the hub so that both side plates partake in its movements.

The wheel rim or driven member 11 is of any suitable construction, but is here shown with inner and outer plate elements 17, 18 rigidly secured to a central drum 20. The axial length of the drum coincides with the width between the hub plates 13 and 14 and the drum has sliding engagement with the latter. The inside diameter of the drum is considerably greater than the outside diameter of the hub 10 so as to provide an annular spring chamber 21.

The spring chamber contains a nest of springs 22, which springs in Figure 2 are shown as spiral or flat clock springs the exterior ends of which are securely anchored, as at 23, in the drum, while their interior ends are anchored, as at 24, in a sleeve 25 surrounding the hub 10 and non-revolubly connected therewith as by a spline 30. The sleeve is preferably shorter than the drum, and a nut 26 threaded on the hub is provided for adjusting the axial position of the sleeve on the hub and at the same time tension the springs, as best seen in Figure 3. In this figure it is thus demonstrated that the flat spiral springs have taken the form of volute springs.

Evidently volute springs may be used instead of the flat spiral ones, or, as seen in Figure 4, both spiral 27 and volute springs 28 may be used.

When the driving member or hub 10 revolves, this movement is transmitted through the springs to the drum 20 and wheel rim 11. If the latter were the driving member the action would be reversed and the movement transmitted through the springs 22 to the hub 10, which then becomes the driven member. Any side or radial shock to any of the members will be taken up by the springs and the snubbers or helpers 31 secured on the hub.

I wish here to refer to some of my recently issued patents somewhat related to this construction and in connection with which it may be used, namely:

Patent No. 1,620,136; dated March 8, 1927, Combined resilient transmission and bearing.

Patent No. 1,637,392; dated August 2, 1927, Combined resilient suspension and transmission.

Patent No. 1,643,682; dated September 27, 1927, Combined resilient bearing and drive.

Patent No. 1,719,382; dated July 2, 1929, Shock absorbing transmission.

It should be noted that when the device is incorporated on a vehicle wheel a load on the hub will cause its axis to be out of alinement with the rim axis; or, in other words, that the transmission member or spring 22 will be eccentric as regards the rim axis.

It has been found advantageous to wind alternate springs right hand and left hand in each nest, thus avoiding all entanglement between adjacent springs.

The sleeve may be left free to travel axially on the hub without being locked when the nut 26 may be dispensed with altogether. On the other hand, it is evident that the axial adjustment of the springs will increase the carrying capacity of the springs, whether of the spiral or the volute type.

In Figure 5 is shown a modified form of the invention in which the sleeve 36 instead of being splined on the hub 35 is threaded thereon, using preferably a thread of very high pitch or lead. In all other respects the construction is as described in connection with the other figures. In this particular case the sleeve with the springs is first mounted centrally on the hub. Directly the hub or driving member starts revolving, the sleeve first travels axially in or out on the hub thereby tensioning the springs which then take the shape shown in Figure 3. As soon as the spring tension corresponds to the load the rotation will be communicated to the driven member or wheel rim. When the hub stops revolving, the sleeve returns to its original central position.

It is to be understood that those skilled in the art may vary the details of construction and arrangement of parts without departing from the spirit of my invention; and, therefore, I do not wish to be limited to such features except as may be required by the claims.

What I claim is:

1. A shock-absorbing transmission comprising a driving member, a driven member and shock absorbing and transmission elements; said members having relative sliding connection with each other in radial direction, one of said members having a cylindrical portion surrounding the other of said members and forming a chamber therewith, a sleeve non-revolubly connected with said other member, said elements comprising springs spirally wound and axially adjustable housed in the chamber, the transmission elements having positive connection at one end with the first of said members and at the other end with said sleeve and the shock absorbing elements having positive connection with said sleeve only.

2. A shock-absorbing transmission comprising a driving member, a driven member and shock absorbing and transmission elements; said members having relative sliding connection with each other in radial direction, one of said members having a cylindrical portion surrounding the other of said members and forming a chamber therewith, a sleeve connected with said other member, said transmission elements comprising spirally wound springs housed in the chamber and having positive connection at one end with the first of said members and at the other end with said sleeve, the shock absorbing elements alternating with said transmission elements, and means for axially adjusting the position of the sleeve with relation to said other member.

3. A shock-absorbing transmission for vehicle wheels, comprising a hub, a wheel rim, the hub and the wheel rim being provided with interengaging sliding connection in radial direction, a sleeve slidably but non-revolubly mounted on the hub, a drum in said wheel rim surrounding the hub and sleeve and forming a chamber therewith, spirally wound springs housed in said chamber and having positive connection with said sleeve and said drum, respectively, and means for adjusting the axial position of the sleeve with relation to the hub.

4. In a shock-absorbing transmission, a driving and driven means equipped with a plurality of vertically disposed resilient elements associated with a tensioning means, some of said resilient elements being non-rotatably mounted as to said driving and driven means and the other elements being secured to one of said means only.

5. In a shock-absorbing transmission, a driving and driven means, and a perpendicularly wound coil spring operatively engaging said driving and driven means, the said spring being also associated with a tensioning means and another similar spring having one end secured to one of said elements.

6. A shock-absorbing transmission comprising a driving member, a driven member, shock absorbing elements and transmission elements; said members having relative sliding connection with each other in radial direction, one of said members having a cylindrical portion surrounding the other of said members and forming a chamber therewith, said transmission elements comprising springs spirally wound and axially adjustable housed in the chamber and having positive connection at one end with the first of said members and at the other end with the other of said members, said shock absorbing elements having positive connection with one of said members only.

7. A shock-absorbing transmission for vehicle wheels, comprising a hub, a wheel rim, the hub and the wheel rim being provided with interengaging sliding connection in radial direction, a sleeve slidably but non-revolubly mounted on the hub, a drum in said wheel rim surrounding the hub and sleeve and forming a chamber therewith, spirally wound springs housed in said chamber and having positive connection with said sleeve and said drum, respectively, snubber springs having positive connection with said sleeve, and means for adjusting the axial position of the sleeve with relation to the hub.

8. In a shock absorbing transmission, driving and driven means, a spring perpendicularly and coaxially disposed relatively to said driving and driven means and operatively engaging said driven means, said spring being associated with an axial tensioning means non-revolubly mounted on said driving means.

In testimony whereof I affix my signature.

BENJAMIN F. SEYMOUR.